United States Patent Office 2,817,324
Patented Dec. 24, 1957

2,817,324

GAS ENGINE

Reinhold Sievers, Augsburg, Germany, assignor to Maschinenfabrik Augsburg-Nurnberg A. G., Augsburg, Germany, a corporation of Germany Application June 3, 1954, Serial No. 434,195

Claims priority, application Germany June 12, 1953

10 Claims. (Cl. 123—120)

This invention relates to internal combustion engines adapted to utilize gaseous fuel, and more particularly to a device for controlling and introducing gaseous fuel in a gas engine.

It is frequently desirable, particularly in two-stroke and charged four-stroke internal combustion engines, to provide for scavenging the residual products of combustion out of the cylinders with air from the inlet ports. With engines adapted to utilize gaseous fuel, however, unless the fuel is introduced into the cylinder separately from the combustion air, such scavenging may lead to substantial increase of fuel consumption as well as so-called afterburning or intake detonations as a result of scavenging with a gas-air mixture and/or the passage of such mixture over the hot portions of the engine immediately after the power stroke.

If, however, an additional fuel inlet valve or port is arranged in the cylinder separately from the air inlet valve or port, separate valves and valve operating mechanism, cams, drives, etc., must all be built into the engine. Such arrangements require a considerable expense as well as increasing the mechanical complexity of the engine, and this is particularly notable in instances where it is desired to convert a liquid fuel engine to gaseous fuel operation.

In contrast, the present invention provides for controlling the introduction of the fuel gas in a manner which is especially simple, and which provides great safety in operation. The fuel gas control member consists essentially of two tubes, coaxially arranged one within the other and mutually rotatably and axially shiftable. Each of these tubes has corresponding congruent apertures formed in their respective surfaces to meter the fuel gas to the engine. This control member may be suitably arranged either inside or outside of the air intake manifold, and in the latter case, the outer tube or sleeve is provided with connecting pipes extending from each of its apertures to the air intake passageways of the individual cylinders. By means of control members constructed in accordance with the invention, the fuel gas supply is so regulated that, immediately after the cylinder intake valve is opened, only clean air is supplied to the cylinder, whereby charging with a fuel gas and air mixture occurs only after the scavenging is finished. Also, the introduction of the gas is interrupted before the intake valve is closed, thus assuring that the space upstream of the intake valve is filled with clean air before the next charging process.

It is especially advantageous to use this control member in four-stroke diesel engines which are to be converted to the use of gaseous fuel where the supplementary introduction of gas inlet and gas measuring members is often difficult for lack of sufficient space. In the gas control member provided by this invention, the conducting, inlet, and control members are united in one structural part, which can easily be built onto existing internal combustion engines or accommodated in their intake manifolds. Also, the present fuel gas control member can be used in two-stroke engines, in which no valve controls are present, and in such instance only a suitable drive, for example, chains, gears, or the like, from the crankshaft of the engine need be provided.

Accordingly, it is a primary object of this invention to provide a fuel gas control device for an internal combustion engine which is relatively simple and inexpensive in construction and operation, and which provides for independent control of the supply of fuel gas to the combustion chambers of the engine to permit scavenging of the combustion chambers with clean air.

Another object of this invention is to provide a fuel gas control member for an internal combustion engine which may be incorporated during the construction of the engine, or may be added to existing internal combustion engines which use liquid fuel to convert these engines for operation with gaseous fuel.

A further object of this invention is to provide a fuel gas control member for an internal combustion engine which delays the supply of fuel gas to the combustion chamber for a predetermined interval after opening of the intake passageway to the combustion chamber, so that residual gas may be purged from the combustion chamber with clean air to prevent after burning gas residues, and wherein the amount of fuel gas supplied to each combustion chamber of the invention during the intake stroke thereof may be independently regulated.

Other objects and advantages of the invention will be apparent from the following description, the accompanying drawing and the appended claims.

In the drawing—

Fig. 3 is an enlarged section similar to Fig. 2 showing a modification of the fuel gas control;

Fig. 4 is a partial section taken longitudinally of the fuel gas control member of Fig. 2; and Fig. 5 is a partial section taken longitudinally of the fuel gas control member of Fig. 3.

Figure 1:
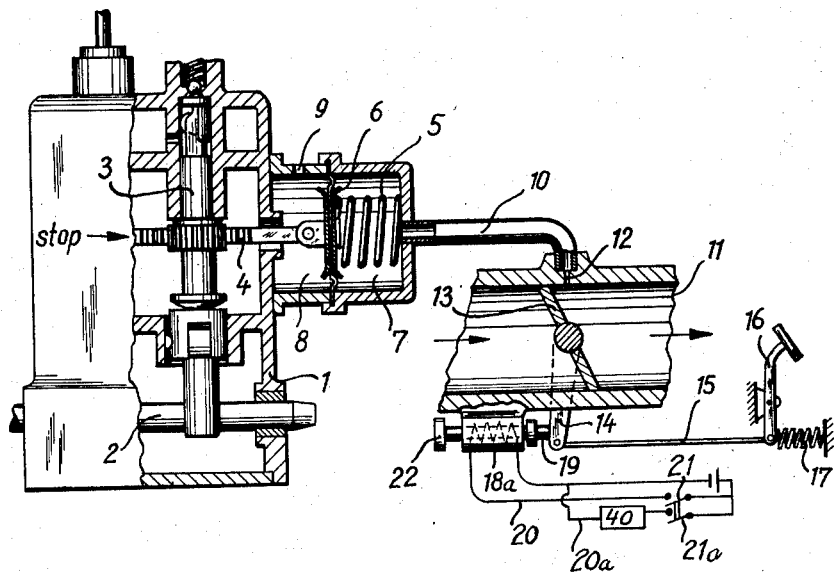
Fig. 1 shows a section through an internal combustion engine embodying the fuel gas control of this invention.

Referring to the drawing, which illustrates preferred embodiments of the invention, there is seen in Fig. 1 an internal combustion engine indicated generally at 10 as including a crankshaft 12 driven by a piston 14 operating in a cylinder 15. A cam shaft 16 controls the movements of a rocker arm 17 in a well-known manner, and the rocker arm is mounted on a cylinder head 21 in which a valve 22 is mounted for reciprocation by the rocker arm to control the admission of combustible fluid to the combustion chamber defined by cylinder 15 through an intake passage 23.

Figure 2:
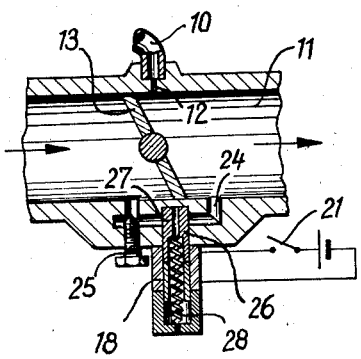
Fig. 2 is a view on an enlarged scale of the intake portion of an internal combustion engine embodying the fuel gas control of this invention.

Referring to Fig. 2, a cooperating intake passageway 24 is suitably affixed to the side of cylinder head 21 to coincide with passageway 23, and to connect this intake passageway with the intake or suction manifold 25 through which air is supplied to the combustion chambers of the engine. In the usual type of internal combustion engine operating on gaseous fuel, this intake manifold conveys a gas-air mixture to the intake passageways from a common mixing nozzle. As pointed out above, this conveying of a gas-air mixture to the combustion chambers in an engine which utilizes scavenging to purge the gas residue from the combustion chambers is undesirable.

In accordance with this invention only clean air is conducted through the intake manifold 25, and the fuel gas is conveyed to the intake passageways separately from the air through a fuel gas control member which includes a cylindrical conduit or sleeve 26 placed within the intake manifold to extend axially therealong, and having a cross-sectional area which is considerably smaller than the cross-sectional area of the manifold so as not marality of combustion chambers, an intake manifold, intake passageways leading from said manifold to each of said combustion chambers for supplying combustible fluid thereto, timing means including valves in each of said intake passageways for controlling admission of said combustible fluid to successive said combustion chambers in a predetermined sequence, a fuel supply member including a sleeve having a plurality of apertures formed therein, each of said apertures being spaced axially of said sleeve from each other and being each in direct flow communication with a separate one of said intake passageways, a tube extending within said sleeve and having a plurality of apertures formed therein spaced axially thereof from each other to coincide with the axial spacing of said sleeve apertures, said tube apertures also being spaced radially about said tube from each other in predetermined sequence, means for supplying fuel gas to said tube, means for rotating said tube relative to said sleeve in timed relation to said timing means providing for registration of each said sleeve aperture and its associated said tube aperture in predetermined timed relation to opening of their adjacent said intake passageway for metering fuel gas into said passageway at intervals dependent upon the opening thereof, and means for sliding said tube axially of said sleeve to vary the effective cross-sectional flow area provided by each said sleeve aperture and its associated said tube aperture during registration thereof.

5. A fuel gas control for converting liquid fuel burning internal combustion engines to the use of gaseous fuel, said control comprising a sleeve having an aperture formed in the side thereof adapted to be placed in constant flow communication with the combustion chamber air intake passageway of the engine, a tube arranged coaxially within said sleeve in sliding engagement with the inner surface thereof, said tube having an aperture formed in the side thereof for registration with said sleeve aperture to provide a metering orifice, means for supplying fuel gas to said tube, and means for rotating said tube within said sleeve at a speed proportional to the rotation of said engine providing for opening and closing of said metering orifice in predetermined timed relationship to the opening and closing of said air intake passageway to the combustion chamber of the engine.

6. A fuel gas control for converting liquid fuel burning internal combustion engines to the use of gaseous fuel, said control comprising a sleeve having an aperture formed in the side thereof adapted to be placed in constant flow communication with the combustion chamber intake passageway of the engine, a tube arranged coaxially within said sleeve in sliding engagement with the inner surface thereof, said tube having an aperture formed in the side thereof for registration with said sleeve aperture to provide a metering orifice, means for supplying fuel gas to said tube, means for rotating said tube within said sleeve at a speed proportional to the rotation of said engine providing for opening and closing of said metering orifice in predetermined timed relationship to the opening and closing of the intake passageway to the combustion chamber of the engine, and means for sliding said tube axially within said sleeve to vary the effective cross-sectional area of said metering orifice independently of said rotating means.

7. In an internal combustion gas engine having a combustion chamber and an air intake passageway for supplying combustion air to said chamber, the combination which comprises a fuel supply pipe for supplying fuel gas to said engine, an aperture in the side of said fuel pipe in constant flow communication with said air intake passageway, a fuel supply control member for regulating the flow of fuel gas to said engine including a tube extending axially within said fuel supply pipe and having its outer surface in sliding contact with the inside of said supply pipe, said tube having an aperture formed in the side thereof for registration with said aperture in said supply pipe to provide a metering orifice, means for supplying fuel gas axially through said supply pipe and said tube therein, and means for rotating said supply pipe and said tube relative to each other for selective intermittent registration of said apertures therein for controlling fuel gas supplied through said apertures to said air intake passageway.

8. In an internal combustion gas engine having a combustion chamber and an air intake passageway for supplying combustion air to said chamber, the combination which comprises a fuel supply pipe for supplying fuel gas to said engine, an aperture in the side of said fuel pipe in constant flow communication with said air intake passageway, a fuel supply control member for regulating the flow of fuel gas to said engine including a tube extending axially within said fuel supply pipe and having its outer surface in sliding contact with the inside of said supply pipe, said tube having an aperture formed in the side thereof for registration with said aperture in said supply pipe to provide a metering orifice, means for supplying fuel gas axially through said supply pipe and said tube therein, means for rotating said supply pipe and said tube relative to each other for selective intermittent registration of said apertures therein for controlling fuel gas supplied through said apertures to said air intake passageway, and means for relative axial sliding movement of said tube and said supply pipe to vary the cross-sectional area of said metering orifice when said apertures are in register with each other.

9. A fuel gas supply and control arrangement for converting liquid fuel burning internal combustion engines having a combustion air intake passageway to the use of gaseous fuel and comprising in combination a supply pipe for supplying fuel to said engine and having an aperture formed in the side thereof for constant flow communication with said air intake passageway, a tube extending axially within said gas supply pipe and having an aperture formed in the side thereof for registration with said aperture in said supply pipe to provide a metering orifice for controlling supply of fuel from said supply pipe into said air intake passageway, means for supplying fuel gas axially through said supply pipe and said tube, and means providing for selective and intermittent relative movement between said tube and said supply pipe for varying the cross-sectional area of said metering orifice to control the supply of fuel to said engine from said supply pipe through said air intake passageway.

10. A fuel gas supply and control arrangement for converting liquid fuel burning internal combustion engines having a combustion air intake passageway to the use of gaseous fuel and comprising in combination a supply pipe for supplying fuel to said engine and having an aperture formed in the side thereof for constant flow communication with said air intake passageway, a tube extending axially within said gas supply pipe and having an aperture formed in the side thereof for registration with said aperture in said supply pipe to provide a metering orifice for controlling supply of fuel from said supply pipe into said air intake passageway, means for supplying fuel gas axially through said supply pipe and said tube, and means providing for selective and intermittent relative movement between said tube and said supply pipe for varying the cross-sectional area of said metering orifice to control the supply of fuel to said engine from said supply pipe through said air intake passageway, both said supply pipe and said tube being disposed within the air intake manifold of said engine.

References Cited in the file of this patent

UNITED STATES PATENTS

| 1,275,481 | Seymour | Aug. 13, 1918 |
| 1,441,302 | Schneider | Jan. 9, 1923 |

FOREIGN PATENTS

| 521,459 | Great Britain | May 22, 1940 |

Dec. 24, 1957    K. MEISSNER    2,817,325
CONTROL DEVICE FOR INTERNAL COMBUSTION ENGINES
Filed July 3, 1956    2 Sheets-Sheet 1

INVENTOR:
Kurt Meissner
BY:
Michael S. Striker
Agt.